US008917373B2

(12) United States Patent
Kinoe et al.

(10) Patent No.: US 8,917,373 B2
(45) Date of Patent: Dec. 23, 2014

(54) ELECTRO-OPTICAL DEVICE AND ELECTRONIC DEVICE

(71) Applicant: Seiko Epson Corporation, Tokyo (JP)

(72) Inventors: Yusuke Kinoe, Suwa (JP); Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/150,608

(22) Filed: Jan. 8, 2014

(65) Prior Publication Data

US 2014/0118677 A1     May 1, 2014

Related U.S. Application Data

(63) Continuation of application No. 13/038,744, filed on Mar. 2, 2011, now Pat. No. 8,654,283.

(30) Foreign Application Priority Data

Mar. 12, 2010    (JP) ................................ 2010-055459

(51) Int. Cl.
     *G02F 1/1335*      (2006.01)
     *G02F 1/1339*      (2006.01)

(52) U.S. Cl.
     CPC ........ *G02F 1/1339* (2013.01); *G02F 1/133512* (2013.01)
     USPC ............................ 349/153; 349/105; 349/104

(58) Field of Classification Search
     USPC ................................. 349/104, 105
     See application file for complete search history.

(56) References Cited

U.S. PATENT DOCUMENTS

| | | | | |
|---|---|---|---|---|
| 4,072,864 | A * | 2/1978 | von Gutfeld | 250/338.4 |
| 6,297,862 | B1 * | 10/2001 | Murade | 349/44 |
| 6,654,083 | B1 * | 11/2003 | Toda et al. | 349/110 |
| 6,906,774 | B2 * | 6/2005 | Saitoh | 349/153 |
| 7,199,855 | B2 * | 4/2007 | Yoshimi et al. | 349/187 |
| 7,282,385 | B2 * | 10/2007 | Gyoda et al. | 438/69 |
| 7,409,121 | B2 * | 8/2008 | Doerr et al. | 385/15 |

(Continued)

FOREIGN PATENT DOCUMENTS

| | | |
|---|---|---|
| JP | 2007-279096 A | 10/2007 |
| JP | 2009-063687 A | 3/2009 |

OTHER PUBLICATIONS

Non-Final Office Action received in U.S. Appl. No. 13/038,744; Feb. 20, 2013.

(Continued)

*Primary Examiner* — Kaveh Kianni
(74) *Attorney, Agent, or Firm* — ALG Intellectual Property, LLC

(57) ABSTRACT

An electro-optical device may include a first substrate, a second substrate, a photo-curable seal member between the first substrate and the second substrate, a first light-shielding layer between the first substrate and the photo-curable seal member, and a second light-shielding layer between the first substrate and the first light-shielding layer. The first substrate may include a pixel area in which pixels are aligned, and a seal region around the pixel area and in which the photo-curable seal member is provided. Within the seal region, the second light-shielding layer may be larger in an outer shape or pattern than the shape or pattern of first light-shielding layer. The pixel area may include an interconnect layer made of the same layer as the one of the light-shielding layers, and the interconnect layer may be narrower than one of the light-shielding layers.

6 Claims, 5 Drawing Sheets

(56) References Cited

U.S. PATENT DOCUMENTS

| | | | |
|---|---|---|---|
| 7,499,130 B2* | 3/2009 | Tsai et al. | 349/110 |
| 7,738,073 B2* | 6/2010 | Inoue et al. | 349/190 |
| 7,808,586 B2* | 10/2010 | Mochizuki | 349/110 |
| 8,031,300 B2 | 10/2011 | Kamijima | |
| 8,654,283 B2* | 2/2014 | Kinoe et al. | 349/104 |
| 2002/0030784 A1* | 3/2002 | Onaka et al. | 349/153 |
| 2002/0196393 A1* | 12/2002 | Tashiro et al. | 349/106 |
| 2004/0036979 A1* | 2/2004 | Saitoh | 359/629 |
| 2004/0135941 A1* | 7/2004 | Nam et al. | 349/110 |
| 2005/0151900 A1* | 7/2005 | Tsai et al. | 349/110 |
| 2005/0186717 A1* | 8/2005 | Gyoda et al. | 438/149 |
| 2006/0255337 A1* | 11/2006 | Jun et al. | 257/59 |
| 2007/0281223 A1* | 12/2007 | Mochizuki | 430/5 |
| 2008/0088569 A1* | 4/2008 | Yokokawa | 345/100 |
| 2008/0186422 A1* | 8/2008 | Ishii | 349/44 |
| 2008/0252838 A1* | 10/2008 | Chan et al. | 349/153 |
| 2009/0033846 A1* | 2/2009 | Yamada et al. | 349/110 |
| 2009/0059174 A1* | 3/2009 | Shirasaka et al. | 353/20 |
| 2009/0310070 A1* | 12/2009 | Ishii | 349/114 |
| 2011/0149178 A1* | 6/2011 | Uno | 348/790 |

OTHER PUBLICATIONS

Final Office Action received in U.S. Appl. No. 13/038,744; Jul. 15, 2013.

Notice of Allowance and Notice of Allowability received in U.S. Appl. No. 13/038,744; Oct. 8, 2013.

\* cited by examiner

ELECTRO-OPTICAL DEVICE AND ELECTRONIC DEVICE

CROSS-REFERENCE

The present application is a continuation application of U.S. patent application Ser. No. 13/038,744 filed on Mar. 2, 2011, which claims priority from Japanese Patent Application No. 2010-055459 filed on Mar. 12, 2010, which are hereby incorporated by reference in their entirety.

BACKGROUND

1. Technical Field

The present invention relates to an electro-optical device such as a liquid crystal device, and to an electronic device with the electro-optical device, for example, a liquid crystal projector.

2. Related Art

Examples of the electro-optical device include a liquid crystal panel in which a liquid crystal, an example of an electro-optical material, is interposed between a pair of substrates. The pair of substrates is bonded together with a UV-curable seal member therebetween. For example, JP-A-2009-63687 discloses that irradiating the liquid crystal panel with UV light from both sides (front face and back face) of the panel facilitates quick and effective curing of the seal member.

In the case of irradiating the liquid crystal panel with UV light from both sides, the UV light is transmitted through openings defined by regions on the substrate where elements and interconnects are provided and which hence have a light shielding effect, before reaching the seal member. In electro-optical devices such as liquid crystal panels, elements and interconnects are now being formed on substrates in an increasingly high level of integration. Accordingly, the proportion of openings in the substrates through which UV light can be transmitted is decreasing, resulting in a technical challenge that a seal member cannot be irradiated with a sufficient amount of UV light.

SUMMARY

An advantage of some aspects of the invention is that an electro-optical device and an electronic device are provided that achieve both a high level of integration of a layered structure and efficient curing process of a seal member, thereby realizing high-quality image display performance.

In one aspect, the invention provides an electro-optical device that includes a pair of substrates bonded together with a photo-curable seal member disposed in a seal region formed around a pixel area where a plurality of pixels are aligned, the electro-optical device including: a plurality of light-shielding layers formed on one of the pair of substrates in a region corresponding to the seal region so as to overlap with each other via an interlayer dielectric in plan view from above the one of the substrates; wherein one of the plurality of light-shielding layers is larger in outer shape than another light-shielding layer formed at a level higher than the one of the light-shielding layer, in plan view from above the one of the substrates.

Thus, the electro-optical device includes the pair of substrates bonded together via a photo-curable seal member such as a UV-curable resin disposed in the seal region formed around the pixel area where the plurality of pixels are aligned.

In the seal region, the plurality of light-shielding layers are provided so as to overlap with each other via the interlayer dielectric. A structure of the light-shielding layer is not specifically limited, as long as it is a layered structure lower in light transmittance than the interlayer dielectric, and may be constituted, for example, by a conductive material or an insulating material. Specific examples of the light-shielding layer include a data line, a scanning line, a shielded interconnect for blocking an electric field generated between conductive layers, a capacitance interconnect constituting a storage capacitor for improving a retention characteristic of pixels, a power supply line for supplying a predetermined potential, and elements and interconnects including dummy interconnects thereof.

In the electro-optical device, in particular, one of the plurality of light-shielding layers is made larger in outer shape than another light-shielding layer formed at a level higher than the former light-shielding layer. In other words, an upper one of the plurality of light-shielding layers is smaller in area than a lower one. Forming thus the light-shielding layers prevents UV light for curing the seal member from being blocked by the upper-level light-shielding layers when the substrate is irradiated with the UV light from the back side thereof, although the UV is blocked by a lowermost light-shielding layer.

It is to be noted that forming the plurality of light-shielding layers overlapping with each other ideally in a completely identical outer shape would prevent UV light from being blocked by the light-shielding layer formed at an upper level. It is not, however, realistic to expect that the plurality of light-shielding layers can be formed in a completely identical outer shape, in view of the current patterning accuracy in forming the light-shielding layers. In the foregoing electro-optical device, UV light can be prevented from being blocked by the light-shielding layers of an upper level, by intentionally forming the upper-level light-shielding layers in a narrower outer shape than a lower one.

Each of the plurality of light-shielding layers includes openings provided so that light incident from an opposite side of the face of the substrate on which the plurality of light-shielding layers are provided (for example, the UV light for curing the seal member) can reach the seal member.

Preferably, the opening may be formed such that the proportion of a predetermined area of the seal region that the opening accounts for is uniform throughout the entirety of the seal region. Here, the expression "uniform" does not require that the proportion becomes exactly the same, but it suffices that the proportion of the opening become approximate to each other, in a plurality of regions having the same area in the seal region. Forming thus the openings allows the seal member provided in the seal region to be irradiated with the curing UV light with a uniform intensity, and to be thereby uniformly cured. Such an arrangement suppresses distortion between the pair of substrates and intrusion of moisture, thus contributing to achieving a high-quality electro-optical device.

The plurality of light-shielding layers may include a conductive layer that constitutes at least a part of interconnects, electrodes, and electronic elements for performing electro-optical operation. The conductive layer may be constituted, for example, by a conductive material or an insulating material, and specific examples include a data line, a scanning line, a shielded interconnect for blocking an electric field generated between the conductive layers, a capacitance interconnect constituting a storage capacitor for improving a retention characteristic of pixels, a power supply line for supplying a predetermined potential, and elements and interconnects including dummy interconnects thereof.

The plurality of light-shielding layers may also include dummy interconnects formed from the same film as reflective pixel electrodes provided in the form of islands for the pixels in the pixel area. Here, "the same film" refers to a film formed using the same deposition process, and does not necessarily mean that the pixel electrode and a connection line are formed of a completely identical film. It is not mandatory that the pixel electrode and the connection line are electrically connected to each other, or the same in thickness or other configuration. In this case, the dummy interconnect may be formed of a light-reflective material such as aluminum, as the pixel electrode. In the case where the reflective light-shielding layer is irradiated with UV light, the UV light is reflected and often provokes damage or alteration of the peripheral interconnects and elements. In the case of the electro-optical device according to the invention, in contrast, since the upper-level light-shielding layers are kept from being irradiated with UV light, such damage or alteration can be effectively prevented.

Thus, the electro-optical device allows the seal member to be efficiently cured even through a highly integrated layered structure, thereby providing high-quality image display performance.

In another aspect, the invention provides an electronic device including the foregoing electro-optical device. Accordingly, an electronic device capable of displaying a high-quality image can be obtained, examples of which include a projector, a TV set, a mobile phone, an electronic organizer, a portable audio player, a word processor, a digital camera, a video recorder with viewfinder or direct-view monitor, a work station, a videophone, a POS terminal, and a touch panel.

The above and other features and advantages of the invention will become more apparent through description of embodiment given hereunder referring to the drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Electro-Optical Device

Figure 1:
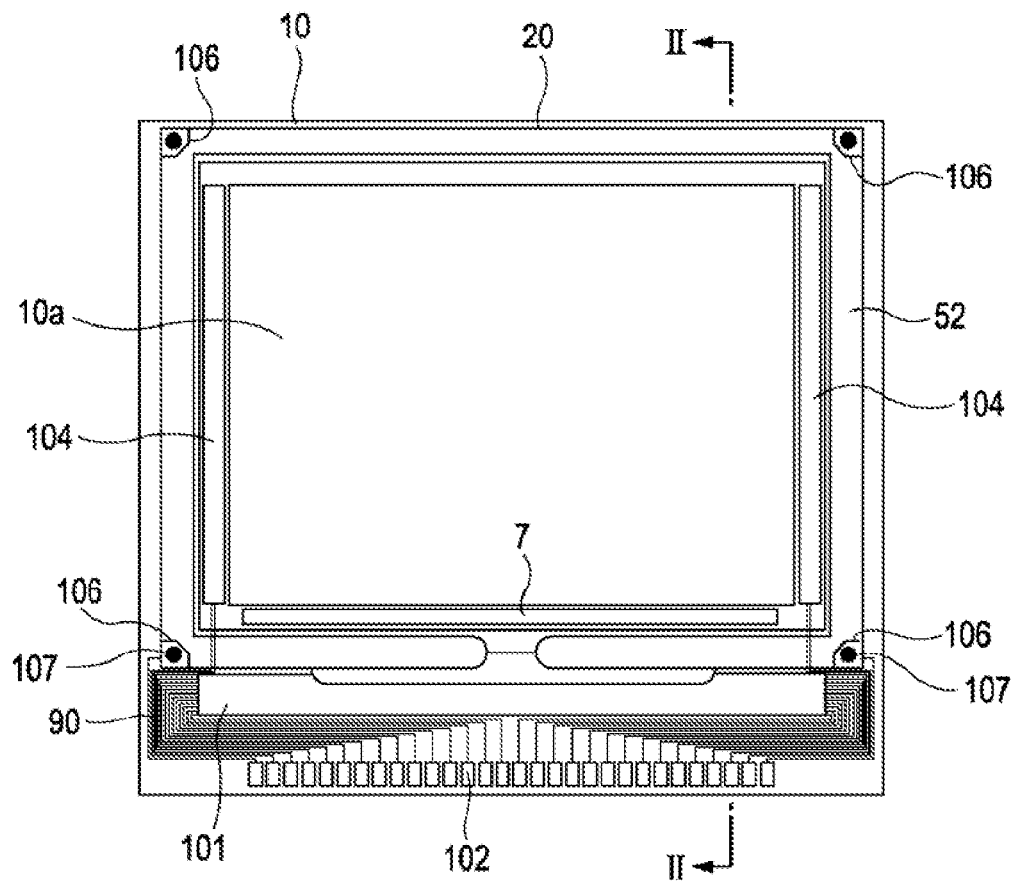
FIG. 1 is a plan view showing a liquid crystal device according to an embodiment including components formed on a TFT array substrate, viewed from the side of a counter substrate.
Figure 2:
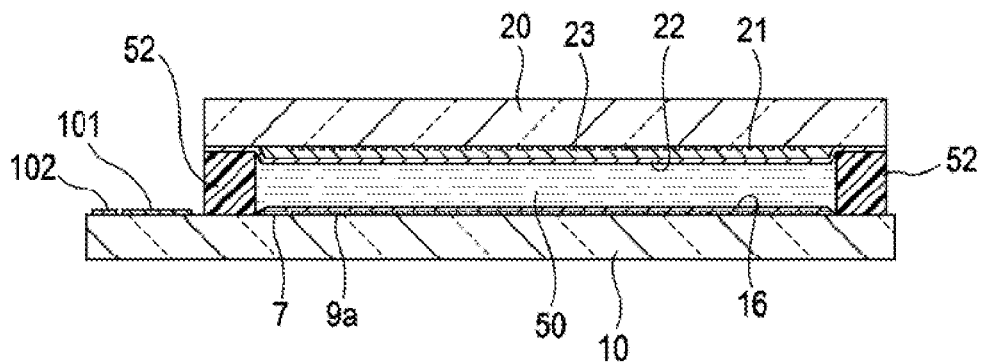
FIG. 2 is a cross-sectional view taken along a line II-II in FIG. 1.

Referring first to FIGS. 1 and 2, an embodiment of an electro-optical device according to the invention will be described. In this embodiment, the electro-optical device will be exemplified by an active matrix liquid crystal device with a built-in drive circuit.

A general configuration of the liquid crystal device according to this embodiment will be described, referring to FIGS. 1 and 2. FIG. 1 is a plan view showing the liquid crystal device according to this embodiment including components formed on a thin film transistor (hereinafter, TFT) array substrate, viewed from the side of a counter substrate, and FIG. 2 is a cross-sectional view taken along a line II-II in FIG. 1.

As shown in FIGS. 1 and 2, the TFT array substrate 10 and the counter substrate 20 are disposed so as to oppose each other, in the liquid crystal device according to this embodiment. The TFT array substrate 10 and the counter substrate 20 may be, for example, a quartz substrate, a glass substrate, or a silicon substrate, and correspond to the pair of substrates according to the invention.

Between the TFT array substrate 10 and the counter substrate 20, liquid crystal exemplifying an electro-optical material is enclosed, constituting a liquid crystal layer 50. The TFT array substrate 10 and the counter substrate 20 are bonded together by means of a sealant 52 provided in a seal region formed around a periphery of an image display region 10a. The image display region 10a is an example of the pixel area according to the invention, and the sealant 52 is an example of the seal member according to the invention.

The sealant 52 may be constituted by a UV-curable resin that can bond the substrates together. In a manufacturing process, the sealant 52 is applied to the TFT array substrate 10 and then irradiated with UV light to be cured. The manufacturing process will be subsequently described in detail. The sealant 52 may contain a spacer material such as a glass fiber or glass beads scattered therein so as to define a predetermined gap between the TFT array substrate 10 and the counter substrate 20.

In an outer peripheral region of the seal region where the sealant 52 is provided, a data line drive circuit 101 and external circuit connection terminals 102 are provided along a side of the TFT array substrate 10. A sampling circuit 7 is provided in an inner region of the mentioned side of the seal region. In a frame region formed along two sides of the seal region adjacent to the first mentioned side, scanning line drive circuits 104 are provided.

On the TFT array substrate 10, vertical conduction terminals 106 are provided at positions opposing the four corners of the counter substrate 20 so as to connect the substrates using vertical conduction materials 107. Thus, electrical connection between the TFT array substrate 10 and the counter substrate 20 can be achieved. Also, routing interconnects 90 are provided for electrical connection among the external circuit connection terminals 102, the data line drive circuit 101, the scanning line drive circuit 104, and the vertical conduction terminals 106.

Referring to FIG. 2, a layered structure is formed on the TFT array substrate 10. The layered structure includes transistors for pixel switching, serving as driving elements, and interconnects such as scanning lines and data lines. Although details of the layered structure are not shown in FIG. 2, pixel electrodes 9a constituted by a transparent material such as Indium Tin Oxide (hereinafter, ITO) are provided in the form of islands in a predetermined pattern for each pixel, on the layered structure.

The pixel electrodes 9a are located in the image display region 10a on the TFT array substrate 10, so as to oppose counter electrode 21 to be described later. An alignment layer 16 is provided so as to cover the pixel electrodes 9a, on a surface of the TFT array substrate 10 opposing the liquid crystal layer 50, in other words over the pixel electrodes 9a.

On a surface of the counter substrate 20 opposing the TFT array substrate 10, the counter electrode 21 constituted by a transparent material such as ITO is provided so as to oppose the plurality of pixel electrode 9a. Here, a color filter may be provided on the counter substrate 20 to thereby enable color display in the image display region 10a. An alignment layer 22 is provided over the counter electrode 21, on the counter substrate 20.

On the TFT array substrate 10 shown in FIGS. 1 and 2, precharge circuits that each provide a precharge signal of a predetermined voltage to the plurality of data lines in advance of image signals, and inspection circuits for inspecting quality and defects of the liquid crystal device during the manufacturing process and before delivery may be provided, in addition to the data line drive circuit 101, the scanning line drive circuits 104, and the sampling circuit 7.

Figure 3:
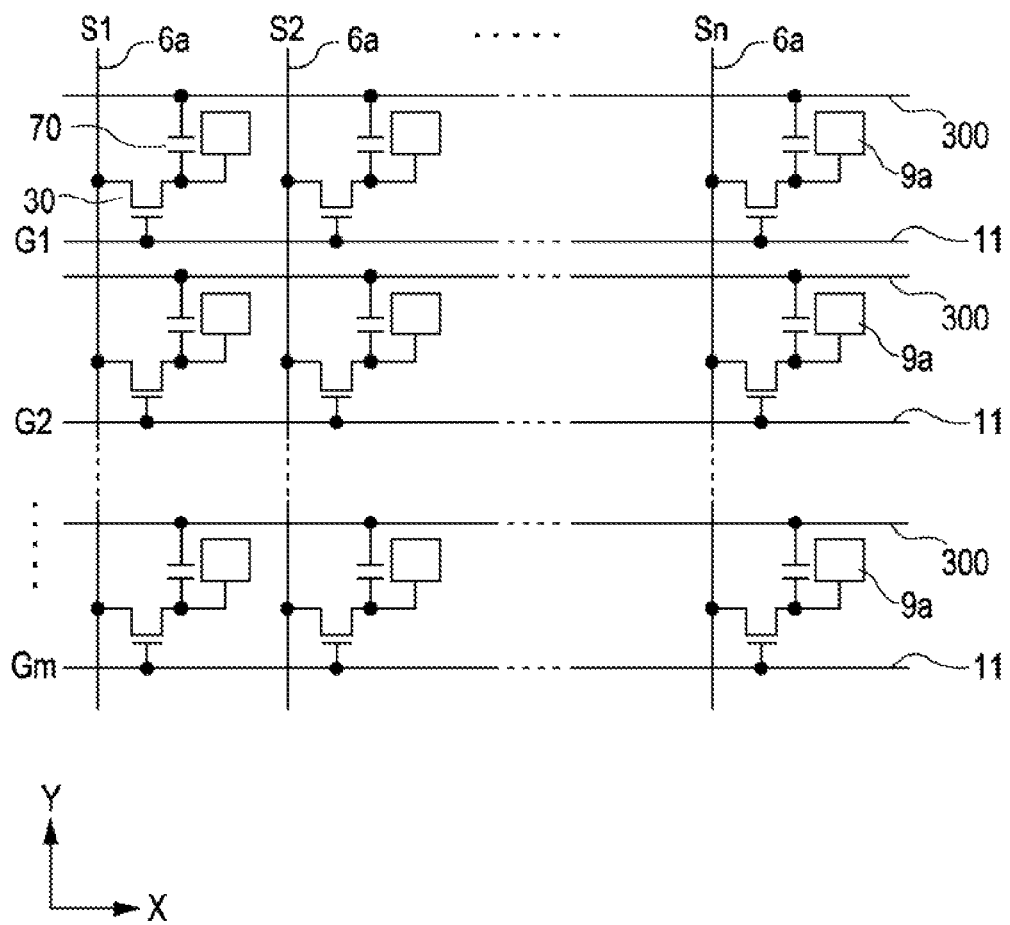
FIG. 3 is an equivalent circuit diagram of elements and interconnects in a plurality of pixels constituting an image display region of the liquid crystal device according to the embodiment.

Referring now to FIG. 3, an electrical configuration in the image display region 10a of the liquid crystal device according to this embodiment will be described. FIG. 3 is an equivalent circuit diagram of elements and interconnects in a plurality of pixels aligned in a matrix pattern and constituting the image display region 10a of the liquid crystal device according to this embodiment.

As shown in FIG. 3, the pixel electrode 9a and a TFT 30 are connected to each of the plurality of pixels aligned in a matrix pattern and constituting the image display region 10a. The TFT 30 is electrically connected to the pixel electrode 9a, and performs a switching control for the pixel electrode 9a when the liquid crystal device is activated. Data lines 6a through which the image signals are provided are electrically connected to the source of the TFT 30. The image signals S1, S2, . . . , Sn written in the data lines 6a may be line-sequentially provided, or provided group by group to a plurality of data lines 6a adjacent to each other.

The scanning lines 11 are electrically connected to the gate of the TFT 30, so that the liquid crystal device line-sequentially applies scanning signals G1, G2, . . . , Gm to the scanning lines 11 in a pulse form and at a predetermined timing. The pixel electrodes 9a are electrically connected to the drain of the TFT 30, so that upon closing the TFT 30 serving as a switching element for a predetermined period, the image signals S1, S2, . . . , Sn provided through the data lines 6a are written at a predetermined timing. The image signals S1, S2, . . . , Sn of a predetermined level written in the liquid crystal through the pixel electrode 9a are retained for a predetermined period between the pixel electrode 9a and the counter electrode 21 on the counter substrate 20.

The liquid crystal constituting the liquid crystal layer 50 (see FIG. 2) changes the orientation and order of molecules depending on the level of the applied voltage, thereby modulating light and enabling gradation display. In a normally white mode, transmittance of incident light is reduced depending on the voltage applied to each pixel, while in a normally black mode the transmittance of incident light is increased depending on the voltage applied to each pixel, so that the liquid crystal device as a whole outputs light that produces a contrast according to the image signal.

To prevent leakage of the retained image signal, storage capacitors 70 are additionally provided parallel to a liquid crystal capacitance formed between the pixel electrodes 9a and the counter electrode 21 (see FIG. 2). The storage capacitor 70 is a capacitance element serving as a retention capacitance that temporarily retains a potential of each pixel electrode 9a in accordance with the provision of the image signal. One of the electrodes of the storage capacitor 70 is connected to the drain of the TFT 30 parallel to the pixel electrode 9a, and the other electrode is connected to a capacitance line 300 of a fixed potential, so as to maintain a constant potential. Providing the storage capacitors 70 results in improved potential retention characteristic of the pixel electrodes 9a, and improved display characteristic such as improved contrast and reduced flickering.

Figure 4:
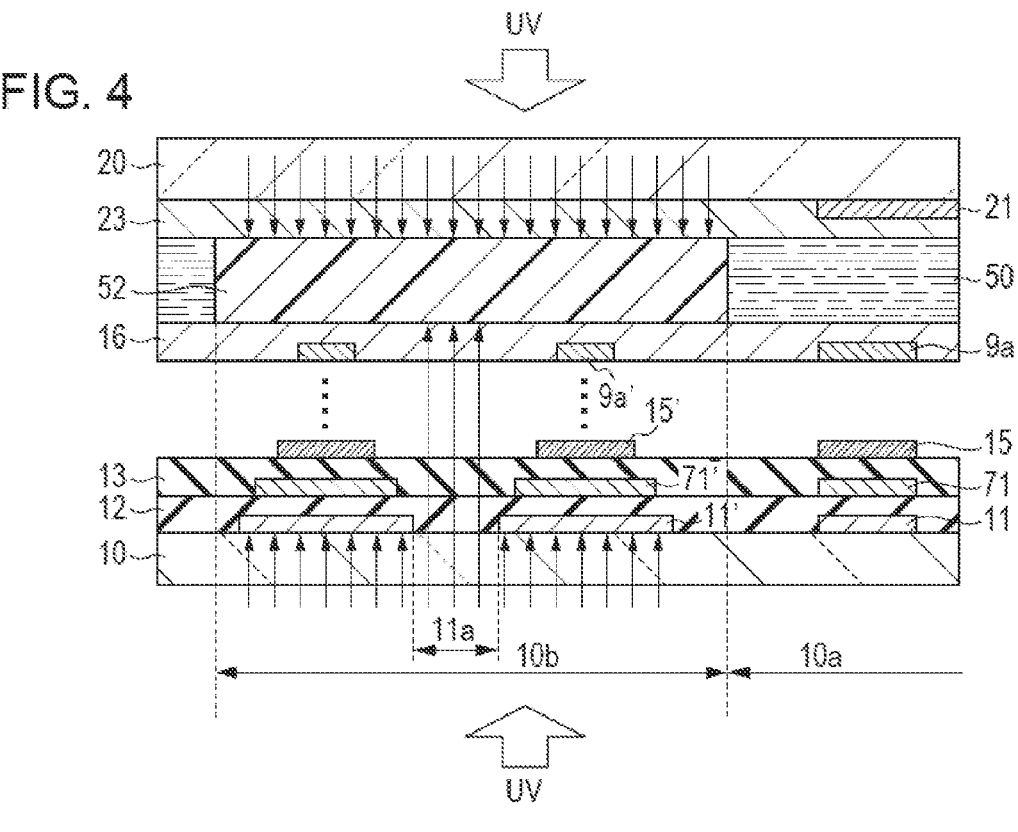
FIG. 4 is an enlarged cross-sectional view showing a structure of the liquid crystal device according to the embodiment.

Proceeding to FIG. 4, a cross-sectional structure of the electro-optical device according to this embodiment will be described in detail. FIG. 4 is an enlarged cross-sectional view showing a structure of the electro-optical device according to this embodiment.

In the image display region 10a on the TFT array substrate 10, the scanning lines 11, capacitance electrodes 71 which are one of the electrodes constituting the storage capacitors 70, light-shielding films 15 for blocking light to the TFT 30 for pixel switching, and the pixel electrodes 9a are layered in this order from the bottom. Interlayer dielectrics 12 and 13 are provided between those layers, and hence those layers are electrically insulated from each other. Although the data lines 6a, the TFT 30 and so forth are provided in the image display region 10a in addition to the layered structure shown in FIG. 4, those are not shown for the sake of convenience of description.

In the seal region 10b on the TFT array substrate 10, where the sealant 52 is provided, dummy interconnects 11', 71', 15' and 9a' are provided, which are formed from the same films as those constituting the scanning lines 11, the capacitance electrodes 71, the light-shielding films 15 and the pixel electrodes 9a formed in the image display region 10a. Here, "the same film" refers to a film formed using the same deposition process, and does not necessarily mean that the dummy interconnects are formed of a completely identical film. Also, it is not mandatory that the dummy interconnects are electrically connected to each other, or have the same thickness or configuration. Accordingly, the dummy interconnects 11', 71', 15' and 9a' are constituted by the same material as that of the scanning lines 11, the capacitance electrodes 71, the light-shielding films 15 and the pixel electrodes 9a. For example, the pixel electrodes 9a which are reflective are formed of light-reflective aluminum, and hence the dummy interconnects 9a' are also formed of aluminum. It is to be noted that the dummy interconnects 11', 71', 15' and 9a' are examples of the light-shielding layer according to the invention.

The dummy interconnects 11', 71', 15' and 9a' formed in the seal region 10b are formed so as to overlap with each other in plan view from above the TFT array substrate 10. In this embodiment, in particular, the dummy interconnects 11', 71', 15' and 9a' are formed such that an upper one of the dummy interconnects becomes smaller in area (smaller in outer shape) than a lower one in plan view from above the TFT array substrate 10. Because of the dummy interconnects 11', 71', 15' and 9a' thus formed, UV light emitted to the sealant 52 for curing from a back side of the TFT array substrate 10 (opposite to the face where the pixel electrodes 9a and so on are provided) in the process of manufacturing the liquid crystal device according to this embodiment is blocked only by the dummy interconnects 11' at a lowermost level, and kept from being blocked by the dummy interconnects 71', 15' and 9a' formed at higher levels (see arrows in FIG. 4). Although UV light for curing the sealant 52 is also emitted from the side of the counter substrate 20 in the manufacturing process, since only the alignment layer 23 is provided on the counter substrate 20 in the seal region 10b, the UV light emitted from the side of the counter substrate 20 reaches the sealant 52 without being blocked. The method of manufacturing the liquid crystal device according to this embodiment will be subsequently described.

The dummy interconnects 11' include openings 11a through which the UV light can be transmitted, in plan view from a back side of the TFT array substrate 10. The UV light emitted from the side of the TFT array substrate 10 is transmitted through the openings 11a thereby reaching and curing the sealant 52. Preferably, the openings 11a may be located at appropriate positions so that the sealant 52 is uniformly cured over the entire seal region 10b, upon being irradiated with the UV light. For example, the openings 11a may be formed in a stripe pattern or a checkered pattern in the seal region 10b, in plan view over the TFT array substrate 10. In other words, the pattern of the openings 11a is not specifically limited, as long as the UV light can be transmitted so as to effectively cure the sealant 52, without compromising the function of the dummy interconnects 11'. Forming thus the openings 11a allows the sealant 52 provided in the seal region 10b to be irradiated with the UV light for curing with a uniform intensity and thus to be uniformly cured, and also effectively prevents intrusion of moisture. Consequently, a high-quality liquid crystal device can be obtained.

Figure 5:
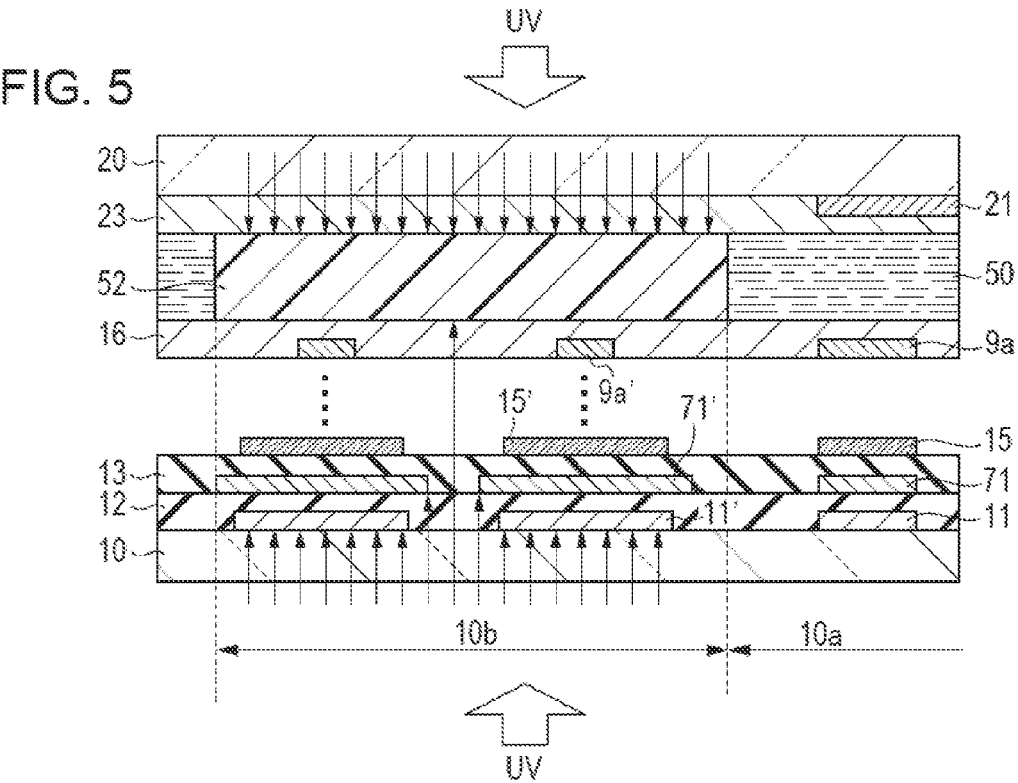
FIG. 5 is an enlarged cross-sectional view showing a structure of a typical liquid crystal device according to a comparative example.

Referring now to FIG. 5, a cross-sectional structure of a typical liquid crystal device according to a comparative example will be described. FIG. 5 is an enlarged cross-sectional view showing a structure of the typical liquid crystal device according to the comparative example.

In the typical liquid crystal device, the dummy interconnects 11', 71', 15' and 9a' provided in the seal region 10b are formed so as to have irregular outer shapes. Accordingly, UV light emitted from a back side of the TFT array substrate 10 is, despite being transmitted through the lowermost dummy interconnects 11', blocked by the dummy interconnects 71', 15' and 9a' of upper levels, and can barely reach the sealant 52 (see arrows in FIG. 5).

In the liquid crystal device according to this embodiment, in contrast, UV light can reach the sealant 52 without being blocked by the dummy interconnects 71', 15' and 9a' of upper levels, and therefore the sealant 52 can be efficiently cured even in the case where the dummy interconnects are formed with a high level of integration in the seal region 10b. Consequently, an electro-optical device capable of displaying a high-quality image can be obtained.

Method of Manufacturing Electro-Optical Device

Figure 6A:
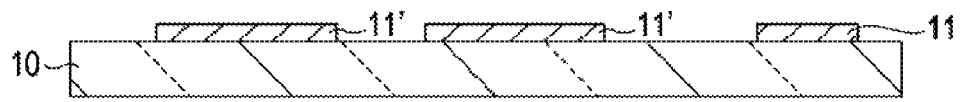
FIGS. 6A to 6C are cross-sectional views sequentially showing a part of a method of manufacturing the liquid crystal device according to the embodiment.
Figure 6B:
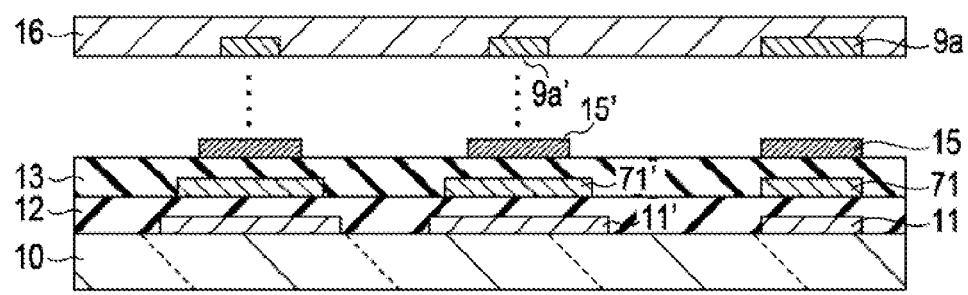
Figure 6C:
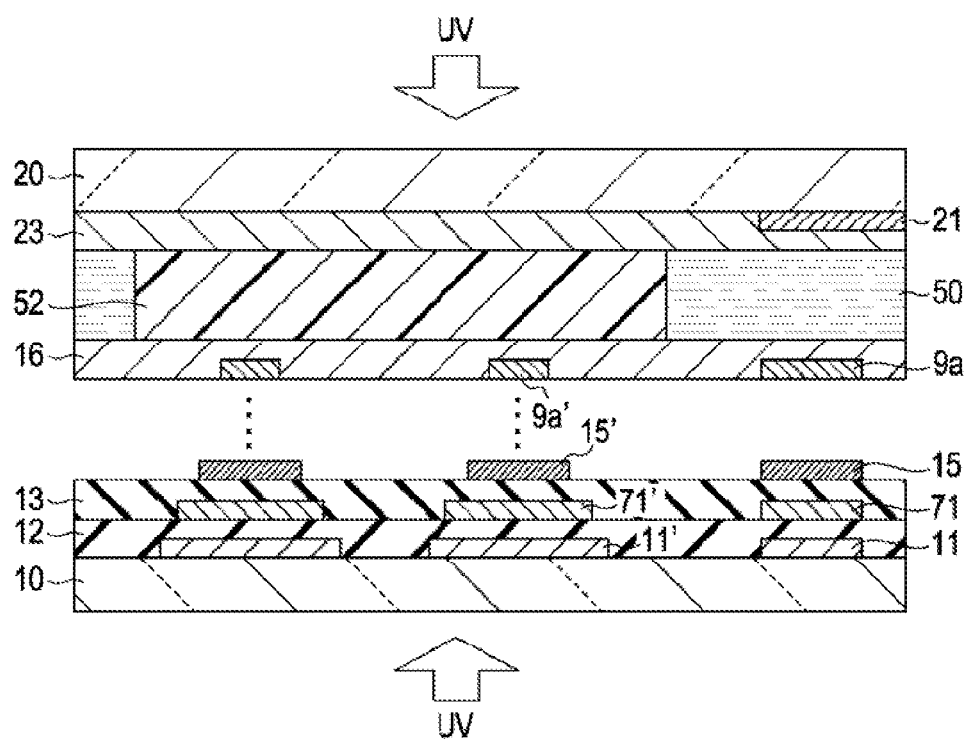

Hereafter, an embodiment of a method of manufacturing the electro-optical device according to the invention will be described referring to FIGS. 6A to 6C. FIGS. 6A to 6C are cross-sectional views sequentially showing a part of the method of manufacturing the liquid crystal device according to this embodiment.

As shown in FIG. 6A, a substrate 10 constituted by silicon, quartz, or glass, for example, is prepared. It is preferable that the substrate 10 is subjected to a pretreatment in an inert gas atmosphere such as nitrogen and at a high temperature as approx. 850 to 1300° C., more preferably at 1000° C., to thereby minimize distortion through a high-temperature process to be subsequently performed.

A metal layer constituted by a light-reflective conductive material such as aluminum or copper is formed, for example, by a sputtering process, all over the substrate 10 thus pretreated. Then, the scanning lines 11 and the dummy interconnects 11' are formed, for example, by an etching process, in a pattern as shown in FIG. 4.

The interlayer dielectric 12 is formed over the scanning lines 11 and the dummy interconnects 11' as shown in FIG. 6B. Then, the scanning lines 11, the capacitance electrodes 71, the light-shielding films 15, and the pixel electrodes 9a, as well as the dummy interconnects 11', 71', 15' and 9a' are formed on the TFT array substrate 10, by forming the insulating layer and the conductive layer in a predetermined pattern through a process similar to the formation of the scanning lines 11, the dummy interconnects 11' and the interlayer dielectric 12. Upon forming the alignment layer 16 over the pixel electrodes 9a and the dummy interconnects 9a', the layered structure on the TFT array substrate 10 can be obtained.

Proceeding to FIG. 6C, the TFT array substrate 10 on which the layered structure is now provided is bonded with the separately prepared counter substrate 20 with the sealant 52 therebetween. An electro-optical material (not shown) such as liquid crystal is enclosed between the TFT array substrate 10 and the counter substrate 20. Upon emitting UV light from both sides of the TFT array substrate 10 and the counter substrate 20 as indicated by arrows in FIG. 6C, the sealant 52 is cured and the liquid crystal device is completed. In this process, since the UV light is not blocked by the upper-level light-shielding films on the TFT array substrate 10, namely the dummy interconnects 71', 15' and 9a' as shown in FIG. 4, the sealant 52 can be efficiently cured.

As described in the above embodiment, the interconnects on the TFT array substrate 10 are arranged such that UV light for curing can effectively reach the sealant 52. Such an arrangement of the interconnects provides a liquid crystal device that can display a high-quality image, despite the requirement for a higher level of integration.

Electronic Device

Figure 7:
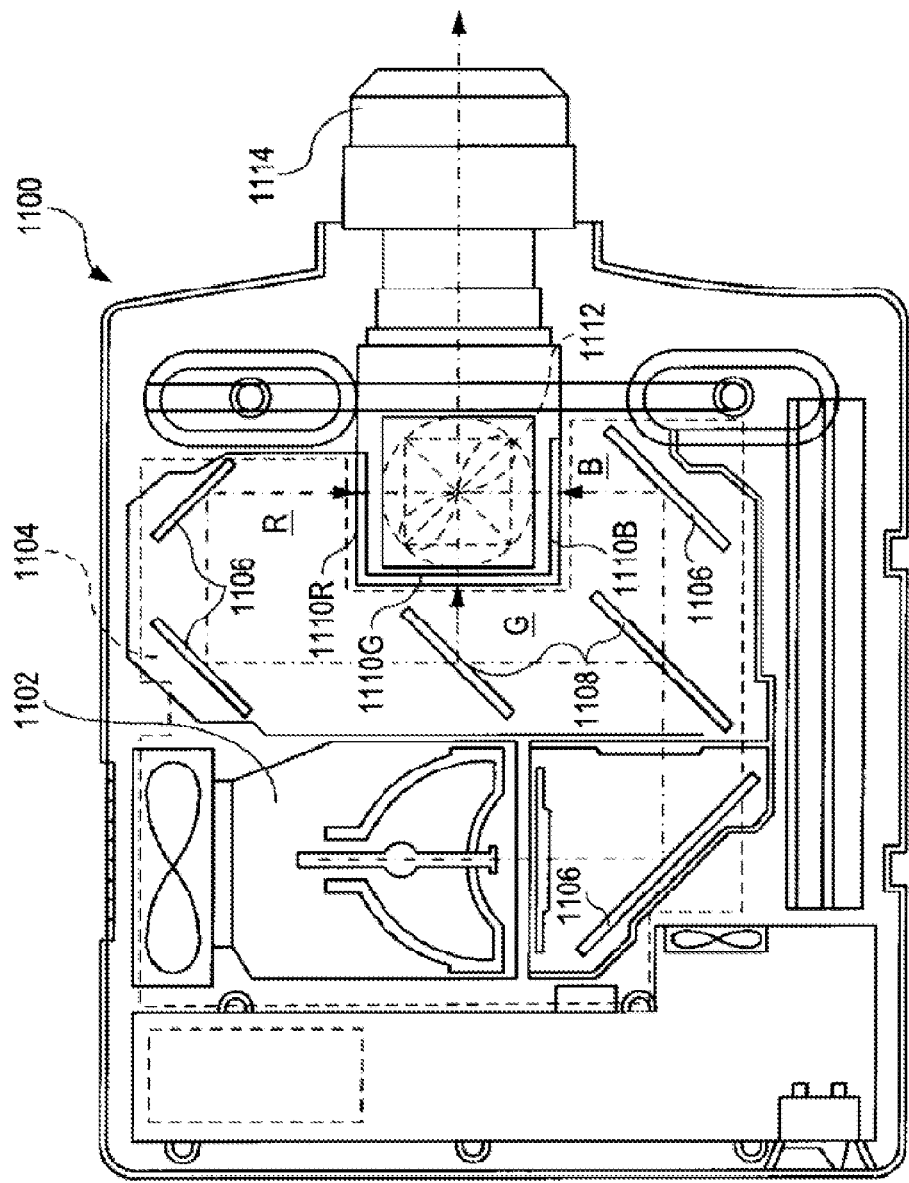
FIG. 7 is a plan view showing a projector exemplifying an electronic device including the liquid crystal device according to the embodiment.

Referring now to FIG. 7, the case where the foregoing liquid crystal device is applied to a projector, an example of an electronic device, will be described. The liquid crystal device is employed as a light valve of the projector. FIG. 7 is a plan view showing a configuration of the projector.

As shown in FIG. 7, the projector 1100 includes a lamp unit 1102, constituted by a white light source such as a halogen lamp. Projection light emitted by the lamp unit 1102 is split into three primary colors of RGB by four mirrors 1106 and two dichroic mirrors 1108 disposed in a light guide 1104, and incident upon liquid crystal panels 1110R, 1110B, and 1110G respectively serving as a light valve corresponding to each primary color.

The liquid crystal panels 1110R, 1110B, and 1110G have the same configuration as that of the foregoing liquid crystal device, and are each driven by primary color signals of RGB provided by an image signal processing circuit. The light modulated by these liquid crystal panels is incident upon a dichroic prism 1112 from three directions. Light of R and B is refracted by 90 degrees while light of G proceeds straight, through the dichroic prism 1112. Accordingly, images of the respective colors are synthesized, so that a color image is projected on a screen through a projection lens 1114.

Regarding the images displayed by the liquid crystal panels 1110R, 1110B, and 1110G, it is to be noted that the images displayed by the liquid crystal panels 1110R and 1110B have to be horizontally flipped with respect to the image displayed by the liquid crystal panel 1110G.

Since the light corresponding to each of the RGB primary colors is incident upon the liquid crystal panels 1110R, 1110B, and 1110G through the dichroic mirrors 1108, there is no need to provide a color filter.

The electro-optical device is applicable to various electronic devices other than the projector shown in FIG. 7, examples of which include a mobile PC, a mobile phone, a liquid crystal TV set, a video recorder with viewfinder or direct-view monitor, a car navigation system, a pager, an electronic organizer, a pocket calculator, a word processor, a work station, a videophone, a POS terminal, and a device with a touch panel.

It is to be understood that the invention is in no way limited to the foregoing embodiments, but may be modified within the scope and spirit of the invention expressed in the entire specification and appended claims, and such modified electro-optical device and electronic device are also included in the technical scope of the invention.

What is claimed is:

1. An electro-optical device, comprising:
   a first substrate;
   a second substrate;
   a photo-curable seal member disposed between the first substrate and the second substrate so as to bond the first substrate and the second substrate together;
   a first light-shielding layer formed between the first substrate and the photo-curable seal member; and
   a second light-shielding layer formed between the first substrate and the first light-shielding layer, wherein
   the first substrate includes:
   a pixel area in which a plurality of pixels are aligned, and
   a seal region defined around the pixel area and in which the photo-curable seal member is provided, and wherein
   the first light-shielding layer forms a plurality of first patterns, one of the plurality of first patterns having a first edge and a second edge which is disposed opposite to the first edge,
   the second light-shielding layer forms a plurality of second patterns, one of the plurality of second patterns having a third edge and a fourth edge which is disposed opposite to the third edge,
   the first edge is arranged at an inner side of the one of the plurality of second patterns and closest to the third edge among edges of the plurality of first patterns in a plan view,
   the second edge is arranged at the inner side of the one of the plurality of second patterns and closest to the fourth edge among edges of the plurality of first patterns in the plan view, and
   the one of the plurality of second patterns overlaps with the one of the plurality of first patterns in the plan view.

2. The electro-optical device according to claim 1, wherein the pixel area includes an interconnect layer made of a same layer as the first light-shielding layer or the second light-shielding layer, and the interconnect layer is narrower than the second light-shielding layer in the plan view.

3. The electro-optical device according to claim 1, wherein the first light-shielding layer and the second light-shielding layer are conductive layers.

4. The electro-optical device according to claim 1, wherein the first light-shielding layer and the second light-shielding layer are metal layers.

5. The electro-optical device according to claim 1, wherein an interlayer dielectric is disposed between the first light-shielding layer and the second light-shielding layer.

6. The electro-optical device according to claim 1, further comprising:
   a third light-shielding layer formed between the first substrate and the second light-shielding layer; wherein
   the third light-shielding layer forms a plurality of third patterns, one of the plurality of third patterns having a fifth edge and a sixth edge which is disposed opposite to the fifth edge,
   the third edge is arranged at an inner side of the one of the plurality of third patterns and closest to the fifth edge among the edges of the plurality of second patterns in the plan view,
   the fourth edge is arranged at the inner side of the one of the plurality of third patterns and closest to the sixth edge among the edges of the plurality of second patterns in the plan view, and
   the one of the plurality of third patterns overlaps with the one of the plurality of second patterns in the plan view.

* * * * *